E. D. WATERBURY.
WEIGHT AND MEASUREMENT INDICATOR.
APPLICATION FILED AUG. 22, 1916.
1,254,952.
Patented Jan. 29, 1918.
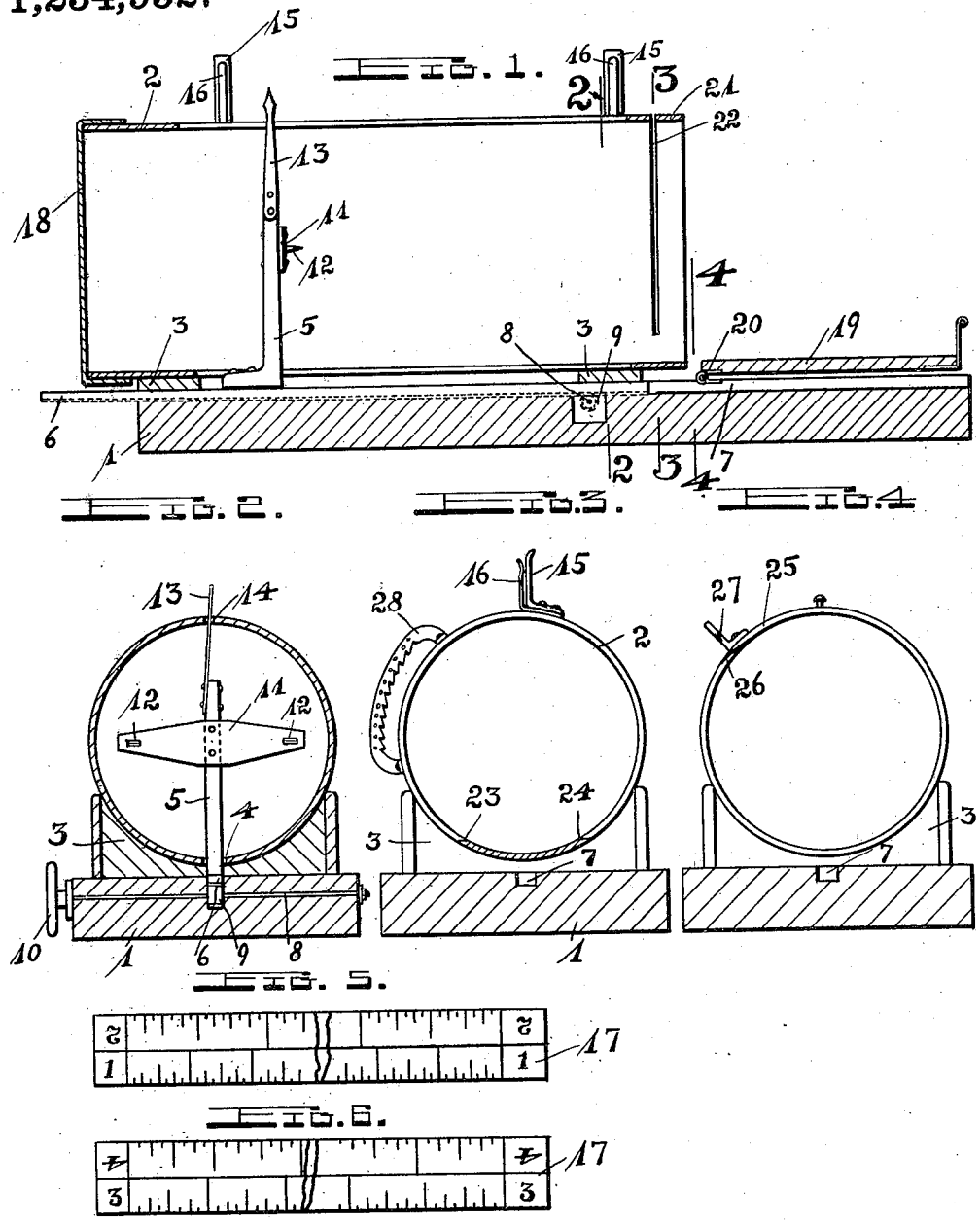

UNITED STATES PATENT OFFICE.

EMERY D. WATERBURY, OF SAWTELLE, CALIFORNIA.

WEIGHT AND MEASUREMENT INDICATOR.

1,254,952.　　　　　Specification of Letters Patent.　　Patented Jan. 29, 1918.

Application filed August 22, 1916. Serial No. 116,296.

*To all whom it may concern:*

Be it known that I, EMERY D. WATERBURY, a citizen of the United States, residing at Sawtelle, in the county of Los Angeles and State of California, have invented new and useful Improvements in Weight and Measurement Indicators, of which the following is a specification.

My invention relates to improvements in weight and measurement indicators; and the objects of my improvements are, to provide a device for measuring and adjusting a material in my device to be cut to any desired weight by the measurement obtained; to provide a device more particularly for cutting any desired weight from what is known as "long horn" cheese which is rapidly superseding the old style of flat round cheese. This cheese is usually made in molds six inches in diameter and twelve inches long, each cheese weighing twelve pounds or one pound to the inch, one-half pound to the half inch, etc.; to provide a protective casing equipped with my measuring device constructed to shut off from the dust and insects when not used for cutting; to provide a measuring device so constructed that when it is discovered on the cutting of the first cut that the cheese has shrunken in size and weight, the indicator can be re-set to show the correct weight for the cheese in this shrunken condition; to provide a scale showing measurement for the material cut in my device under different conditions; to provide means for yieldably holding my scale in adjusted positions; to provide clamping means for holding the material firmly against movement during the cutting operation; to provide indicating means on the clamping means to indicate the shrinking of the inserted material after which the right weight scale can be placed on the device; the invention consisting in the construction, combination and arrangement of devices hereafter more fully described and claimed, and illustrated in the accompanying drawing, in which—

Figure 1 is a vertical longitudinal section of my device.

Fig. 2 is a vertical cross-section on line 2—2 of Fig. 1.

Fig. 3 is a vertical cross-section on line 3—3 of Fig. 1.

Fig. 4 is a vertical cross-section on line 4—4 of Fig. 1.

Fig. 5 is a part of my scale showing the front.

Fig. 6 is a part of my scale showing the back.

Similar reference characters refer to similar parts throughout the several views.

On the base-plate 1 is mounted a drum 2, preferably made of thin sheet metal. Blocks 3 are fitted to the drum 2, forming the rest for the horizontally placed drum on the base plate, see also Figs. 2, 3 and 4.

A slot 4 is provided longitudinally in the lower side of the drum, see Fig. 2, in which a standard 5 is slidingly movable, said standard being mounted on a rack-bar 6. The rack-bar 6 is slidingly placed in a groove 7 in the base plate 1. A shaft 8 is inserted crosswise through the base plate 1. A pinion 9 is secured to the shaft 8 engaging with the rack-bar 6. A small handwheel 10 is also secured to the shaft 8 sidewise from the base plate for operating the shaft with pinion.

A cross piece 11 is secured to the standard carrying spurs or prongs 12. An indicating finger 13 is also secured to the standard projecting upwardly through the drum 2 for which purpose another slot 14 is provided on the upper side of the drum, see Fig. 2, the slot 14 allowing a movement corresponding to the movement allowed to the standard by the slot 4 in the lower side of the drum.

A clamp member 15 is secured outside of the drum near the slot 14 near each end of the slot, a spring 16 being secured with the clamp members forming the counter member to the clamp members, see Figs. 1 and 3.

The scale strap 17, shown in Figs. 5 and 6 is yieldably and exchangeably held in the clamp members, under normal conditions when using my device; though it is not shown in proper place, it will easily be understood that this strap can be inserted between the clamp member 15 and the spring 16.

The strap is only left out of the clamp members so as not to interfere with a thorough comprehension of the drawing, in Fig. 1, the strap would appear before the clamp member 15 and behind the spring 16.

The strap is provided with a number of different scales, two being shown on the front side of the strap, which is illustrated in Fig. 5, while two more are shown on the back side of the strap, which is illustrated in Fig. 6. And it will easily be understood that a number of straps can be kept to suit different purposes and different conditions.

The rear end of the drum is normally closed by a cap 18, see Fig. 1.

The front end can be closed by the door 19 hingedly attached to the base plate 1, at 20.

At the front end of the drum, a ring 21 of suitable width is split from the drum remaining attached to the drum by the short section indicated between the reference characters 23 and 24, see Fig. 3. The ring is shown in Fig. 4 in end view, one end 25 engaging slidingly over the end 26 allowing a compression of the ring thereby forming a clamp ring. An engaging click 27 is secured to the end 25 of the clamp ring 21 by which the clamp ring can be operated and set to engage with the ratchet bar 28, secured to the drum 2 close to the clamp ring.

The drum being shown of cylindrical form, it will easily be understood that any other suitable form can be provided.

Any material inserted into the drum can be shifted by the handwheel 10 in turning same, thereby turning the shaft 8 and the pinion 9 secured to the shaft, the pinion engaging with the rack-bar 6 to which the standard 5 is secured.

Having inserted the material into the drum pressing it slightly against the standard 5, by operating the handwheel, the material is shifted out of the drum.

This device is especially for material of uniform thickness, diameter or section of which the weight is known in reference to the section.

It will easily be understood that, by providing a certain graduation on the ratchet bar 28 of Fig. 3, the weight of a certain material in reference to its section may be ascertained by setting the clamp ring 21 close to the material, the click 27 of Fig. 4 engaging with the ratchet bar in Fig. 3 thereby pointing to a certain graduation on the ratchet bar. A scale strap relating to this certain ascertained weight measurement is then placed on top of the device held in the clamp members 15. The standard pressing against the inserted material having the indicating finger 13 projecting through the drum can then be set at a certain graduation on the scale to start with, and any further shifting of the standard will be indicated on the scale, the shifting of the inserted material by the standard from one graduation to the next graduation will then mean one pound, one-half pound, etc., corresponding to whatever the known weight of such movement is in reference to the section of the material.

The device is especially for cutting any desired weight from what is known as "long horn" cheese. This cheese is known to weigh one pound to one inch length if six inches in diameter, as usual, and, as the different shrinkages are known also, with the weight of the cheese in the condition of the different shrinkages, a suitable scale can be placed on top of this device according to the shrinkage ascertained by the clamp ring graduations, and any slice of any desired weight can be cut off when shifted out of the device by the operating mechanism described above.

Having thus described my invention, I claim:—

1. A weight indicator comprising a holder having means at one end for closing upon the circumference of the material disposed in the holder, a measurement-indicating scale provided on the holder near the adjustable end of the holder, a follower slidably mounted on the holder carrying an indicator, and a longitudinally disposed scale yieldably and exchangeably held above the holder adjacent to the indicator.

2. A weight indicator of the class described comprising a holder having means at one end for adjustably fitting over the material inserted into the holder, a measurement-indicating scale provided on the holder near the adjustable end of the holder, a follower slidably mounted on the holder carrying an indicator, and the scale yieldably and exchangeably held above the holder adjacent to the indicator, the scale being constructed in conformity with the measurement-indication on the holder for indicating the weight in relation to the measurement indication on the holder.

3. A weight indicator consisting of a support, a follower mounted for longitudinal movement thereon and carrying an indicator, a scale mounted on said support for coaction with said indicator, said scale being adjustable longitudinally, and resilient means for holding said scale in adjusted position.

4. A weight indicator consisting of a support, a follower mounted for longitudinal movement thereon, a plural measuring scale arranged longitudinally of said support and exchangeably mounted for longitudinal movement, and a resilient indicating finger carried by said follower and having its path adjacent to said scale.

5. The combination with a base, a tubular casing mounted sidewise thereon, and having longitudinally extending diametrically opposite slots in its top and bottom, a rack-bar mounted for longitudinal movement in said base below said casing, a pinion meshing with said rack for reciprocating it longitudinally, a follower fixed to said rack-bar and projecting transversely of said casing through the bottom slot therein, an indicating finger carried by said follower and projecting through the top slot in said casing, clamp members secured to opposite ends of said casing at the top thereof, and a plural scale mounted in said clamp members.

In testimony whereof I hereunto affix my signature in the presence of two witnesses.

EMERY D. WATERBURY.

Witnesses:
A. J. GEORGIA,
O. M. CLARK.

Copies of this patent may be obtained for five cents each, by addressing the "Commissioner of Patents, Washington, D. C."